July 21, 1959 W. G. JENSEN 2,896,040
INTERNALLY MOUNTED CONTACTS
Filed Nov. 7, 1955
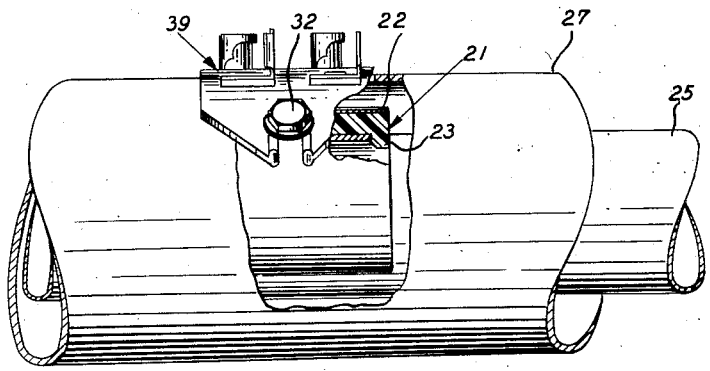
FIG. 1
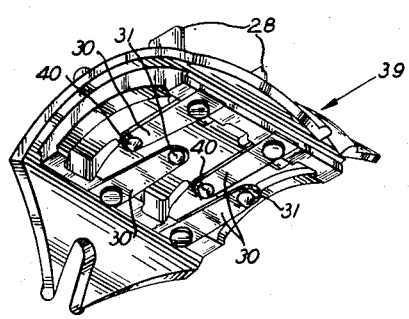
FIG. 2
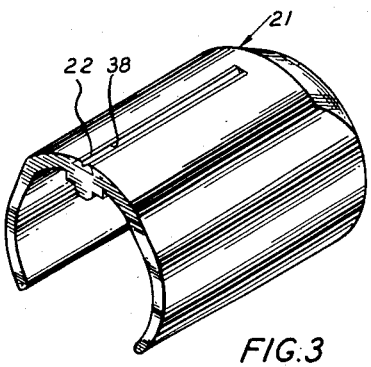
FIG. 3
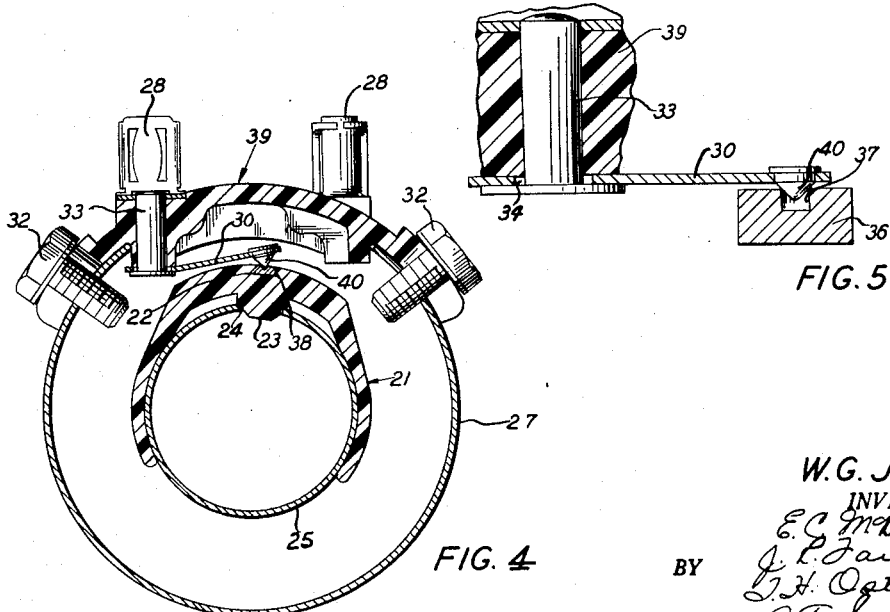
FIG. 5
FIG. 4
W. G. JENSEN
INVENTOR.
BY
ATTORNEYS

United States Patent Office 2,896,040
Patented July 21, 1959

2,896,040

INTERNALLY MOUNTED CONTACTS

William G. Jensen, Dearborn, Mich., assignor to Ford Motor Company, Dearborn, Mich., a corporation of Delaware Application November 7, 1955, Serial No. 545,260

6 Claims. (Cl. 200—61.54)

This invention relates to an internally mounted selective contact system and more particularly to an automobile transmission selector contact system which may be mounted on the transmission selector assembly shaft and/or the steering column shaft.

It is frequently desirable in automobile and other motor vehicle transmission selector assemblies of today to associate certain transmission selector positions with the making or breaking of an electrical circuit such as the starter circuit or backup light circuit. For example, when the transmission selector is in the reverse position, it is often desirable to complete the circuit for the backup light and when the transmission selector is removed from the reverse position it is desirable to break the backup light circuit. Also for safety reasons the starter circuit is preferably closed only when the transmission selector is in a neutral or parked position.

In the past a means used for the making and breaking of these circuits upon movement into and out of various transmission selector positions has been one which has been attached to the end of the transmission selector tube which is on the engine side of the automobile floorboard and therefore exposed to dirt, moisture, and engine heat. It was thought necessary in the past to place this unit, which required separate housing and mounting, at the end of the tube. This invention provides for such a unit relatively inexpensively mounted intermediately on the shaft and column thereby placing it on the passenger side of the floorboard reducing greatly the dirt, moisture and heat to which the unit was exposed and instead of increasing the cost of the unit substantially reducing it due in part to the elimination of separate housing and mounting.

Also, certain kinds of transmission selector tubes move axially as well as rotatively and a unit designed to close a circuit under such multi-dimensional movement was complicated and expensive in nature. This invention provides for a comparatively simple and inexpensive unit that will perform these functions.

It is therefore an object of this invention to provide a transmission selector contact unit which may be inexpensively mounted in the passenger compartment of a motor vehicle unit thereby reducing the amount of dirt, moisture, and heat to which the unit is subjected eliminating the need for excessive repairs. It is a further object of this invention to provide a simple, inexpensive unit for establishing a circuit upon rotative as well as axial motion of a transmission selector tube.

Other important features and objects of the invention to which reference has not been made hereinabove will appear hereinafter when the following description and claims are considered with the accompanying drawings in which:

Figure 1 shows a partial, cutaway, side elevational view of an embodiment of this invention mounted on the transmission selector assembly shaft and the steering column;

Figure 2 shows an enlarged perspective view of the contact housing;

Figure 3 shows a perspective view of the collar;

Figure 4 shows a cross sectional end view of an embodiment of this invention; and Figure 5 shows an enlarged view of the prong and rivet connection.

In Figure 1 is shown collar 21 which is snapped about transmission selector assembly shaft 25 which in this case is the shaft leading from the manual transmission selector lever, not shown, to linkage operating the manual selector unit in an automatic transmission although this invention may be used on units other than an automatic transmission. Collar 21 is made of a nylon composition, although other non-conductive, durable materials may be used, and has a longitudinal opening allowing it to be snapped about shaft 25 as may be better seen in Figure 4. Collar 21 has boss 23 which fits into locator opening 24 of shaft 25. Concentric with shaft 25 is steering column 27 which supports the steering wheel but is not rotated therewith but substantially fixed in relation to the automobile chassis. Inserted into column 27 is housing 39 which is bolted thereto by bolts 32 which are shown clearly in Figure 4.

Shown in Figure 2 is a perspective view of housing 39 wherein may be seen terminals 28. These terminals shown more clearly in Figure 4 while being of slightly different configuration serve the same purpose of connecting or providing for connection between exterior conductors, not shown, and rivets 33 which are in contact with prongs 30 which may be seen in both Figures 2 and 4. Rivets 33 extend through housing 39 and securely attach and connect terminals 28 and prongs 30 which have contact points 31, 40 which may be seen in Figures 2 and 4. Shown in Figure 3 is conductor bar 22 which extends longitudinally in collar 21 and groove 38 which extends longitudinally in conductor bar 22 which bar may be made of a conducting material such as copper.

The operation of this embodiment is as follows. Shaft 25 is rotatable upon movement of the manual gear shift selector which is not shown. Collar 21 is relatively fixed to shaft 25 and rotates therewith causing bar 22 to move into and out of engagement with contacts 31 and 40. It may be seen from Figure 2 that contacts 31 are aligned as are contacts 40 and as bar 22 is rotated it comes into engagement with contacts 31 simultaneously or substantially simultaneously thereby providing electrical contact therebetween. Due to the configuration of bar 22, shaft 25 can move axially as well as rotatively and still maintain connection between the contacts. In this case contacts 31 close a starting circuit when the manual selector lever is in a neutral position. When shaft 25 is rotated, to the reverse gear position, bar 22 moves accordingly closing the circuit between aligned contacts 40. Contacts 40 communicate with the backup light circuit thereby closing it causing current to flow therethrough. Connector bar 22 may vary in number, size, configuration, and location in collar 21 without departing from the scope of this invention. Likewise prongs 30 and contacts 31 may be varied as desired. Bar 22 has groove 38 formed therein and this groove aligns contacts 31 thereby preventing them from slipping off the conductive surface of bar 22 onto the nonconducting surface of collar 21 and interfering with the circuit. Also due to groove 38 the contacts, which are spring urged towards the center of shaft 25 by prongs 30 are scraped along the corners thereby acting in a self-cleaning manner tending to insure relatively low resistance between the groove 38 and contacts 31.

Figure 5 shows that hole 34 in prong 30 through which rivet 33 extends is slightly larger than the shaft diameter of rivet 33. During assembly contacts 31 are aligned in locators 37 in fixture 36 while housing 39 is also positioned in fixed relation to fixture 36 and then rivet 33 is installed thereby securing prong 30 in housing 39. In this manner if any mismatch between parts exists prior to assembly it is taken up by the play between prongs 30 and rivets 33 before rivet installation thereby giving an accurate positioning of contacts 31 in a low cost mass production method.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. In a motor vehicle gear selector assembly having a rotatably and axially movable gear selector tube enclosed within a fixed housing, that improvement comprising a collar carried by the gear selector tube, a current conducting member carried by said collar, a terminal portion carried by the housing, said portion including a staggered spring urged contacts, said member arranged to selectively close an electrical circuit between pairs of said contacts upon rotation only of said tube, and to maintain said circuit upon axial movement only of said tube.

2. The assembly as in claim 1 wherein said collar consists of a substantially U-shaped section of resilient dielectric material having a position locating boss on the inside thereof, said gear selector tube provided with a recess for receiving said boss.

3. The assembly as in claim 1 wherein said current conducting member is provided with a V-shaped longitudinal recess, said contacts having pointed portions for engaging said bar at said recess.

4. In an automatic transmission selector assembly having a selector shaft rotatably and axially movable within a fixed tubular steering column, that improvement comprising an electrical terminal housing carried by said selector shaft, said housing having spring mounted contacts fixed thereon, an elastic collar carried by said selector shaft, a conducting bar being fixed to and axially aligned on said collar, said bar being registerable with sets of said contacts as said collar is rotated by said shaft, said bar adapted to maintain registration once established with said contacts upon axial movement of said shaft.

5. The improvement of claim 4 wherein said housing has a first and a second pair of contacts, a first pair of said contacts being in a back-up light circuit, a second pair of contacts being in an engine starting circuit, said bar being in registration with said first pair of contacts when said selector shaft is in a reverse position, and said bar being in registration with the second pair of contacts when said selector shaft is in a neutral position.

6. In a selector switch assembly, concentric elements comprising an inner member and an outer member, said inner member adapted to rotate and move axially with respect to said outer member and having a split dielectric sleeve portion affixed thereto, said portion including at least one longitudinal current conducting bar, a terminal housing carried by said outer member and having at least one pair of spaced contacts simultaneously registerable with said bar upon rotation of said inner member, and said conducting bar being substantially longer than the width between said spaced contacts and defining a longitudinal edge portion over which said contacts pass upon rotation of said inner member thereby cleaning said contacts.

References Cited in the file of this patent

UNITED STATES PATENTS

| | | |
|---|---|---|
| 1,118,024 | Lawrence | Nov. 24, 1914 |
| 1,300,484 | Radley | Apr. 5, 1919 |
| 1,301,493 | Niemeyer | Apr. 22, 1919 |
| 1,471,778 | Cope | Oct. 23, 1923 |
| 1,682,790 | Janette | Sept. 4, 1928 |
| 1,832,857 | Collier | Nov. 24, 1931 |
| 1,910,081 | Bell | May 23, 1933 |
| 1,919,209 | Douglas | July 25, 1933 |